(12) United States Patent
Simmons et al.

(10) Patent No.: US 12,029,175 B2
(45) Date of Patent: Jul. 9, 2024

(54) PLANT SUPPLEMENT DELIVERY ASSEMBLIES, AND METHODS FOR DELIVERING PLANT SUPPLEMENTS

(71) Applicant: BATTELLE MEMORIAL INSTITUTE, Richland, WA (US)

(72) Inventors: Kevin L. Simmons, Kennewick, WA (US); Stanley L Owsley, Jr., Pasco, WA (US); Dustin T. Clelland, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/031,391

(22) Filed: Sep. 24, 2020

(65) Prior Publication Data

US 2021/0092907 A1   Apr. 1, 2021

Related U.S. Application Data

(60) Provisional application No. 62/906,486, filed on Sep. 26, 2019.

(51) Int. Cl.
*A01G 7/06* (2006.01)
(52) U.S. Cl.
CPC ...................... *A01G 7/06* (2013.01)
(58) Field of Classification Search
CPC ...... A61M 5/2033; A61M 5/20; A61M 5/178; A61M 2005/1787; A01G 7/06
(Continued)

(56) References Cited

U.S. PATENT DOCUMENTS

| 3,130,519 A | 4/1964 | Mauget |
| 3,175,473 A | 3/1965 | Boteler et al. |

(Continued)

FOREIGN PATENT DOCUMENTS

| EP | 2550856 | 10/2016 |
| EP | 20869502 | 9/2023 |

(Continued)

OTHER PUBLICATIONS

WO PCT/US20/052568 Search Rpt, dated Jan. 29, 2021, Battelle Memorial Institute.

(Continued)

*Primary Examiner* — Brady W Frazier
*Assistant Examiner* — Zoe Tam Tran
(74) *Attorney, Agent, or Firm* — Wells St. John P.S.

(57) ABSTRACT

Plant supplement delivery assemblies are provided that can include an insert having collapsible insert sidewalls complimentary to the exterior sidewalls of the delivery assembly housing, the collapsible insert sidewalls defining at least a portion of a container configured to house a plant supplement.
A butt end of the insert can be configured to operably engage a biased member.
Methods for providing plant supplements are also provided. The methods can include operably engaging a biased member with a butt end of a container to collapse sidewalls of the container and provide plant supplement from the container through a stem into a plant.
Methods for recycling components of a plant supplement delivery assembly are also provided. The methods can include, after providing plant supplements from an insert of a plant supplement delivery assembly, removing the spent insert from the assembly and replacing the spent insert with a sealed insert.

18 Claims, 11 Drawing Sheets

(58) Field of Classification Search
USPC .......................................................... 47/57.5
See application file for complete search history.

(56) References Cited

U.S. PATENT DOCUMENTS

| | | | |
|---|---|---|---|
| 3,335,913 A | | 8/1967 | Bouet |
| 3,951,310 A | * | 4/1976 | Steiman ................ B65D 83/75 |
| | | | 222/340 |
| 4,011,685 A | | 3/1977 | Boyd et al. |
| 4,136,802 A | | 1/1979 | Mascia et al. |
| 4,365,440 A | * | 12/1982 | Lenardson ............... A01G 7/06 |
| | | | 128/200.22 |
| 4,592,744 A | | 6/1986 | Jagger et al. |
| 4,989,366 A | * | 2/1991 | DeVlieger ............... A01G 7/06 |
| | | | 47/57.5 |
| 5,289,948 A | | 3/1994 | Moss et al. |
| 5,599,309 A | * | 2/1997 | Marshall ................. A61M 5/46 |
| | | | 604/117 |
| 6,032,411 A | * | 3/2000 | Foust ....................... A01G 7/06 |
| | | | 47/57.5 |
| 8,287,521 B2 | | 10/2012 | Kriesel et al. |
| 8,794,488 B2 | * | 8/2014 | van der Molen ... B05B 11/3087 |
| | | | 222/207 |
| 9,629,311 B2 | | 4/2017 | Park |
| 9,669,206 B2 | * | 6/2017 | Spohn ................. A61G 7/0503 |
| 2005/0223637 A1 | * | 10/2005 | Black ................. B65D 83/0038 |
| | | | 47/57.5 |
| 2006/0201063 A1 | | 9/2006 | Huon |
| 2008/0306446 A1 | * | 12/2008 | Markussen .............. A61M 5/20 |
| | | | 604/139 |
| 2013/0310758 A1 | * | 11/2013 | Wozencroft ........ A61M 5/3202 |
| | | | 604/197 |
| 2013/0317430 A1 | * | 11/2013 | Brereton ................. A61M 5/20 |
| | | | 604/117 |
| 2016/0058946 A1 | | 3/2016 | Gelblum et al. |

FOREIGN PATENT DOCUMENTS

| | | |
|---|---|---|
| JP | 2015-149990 | 8/2015 |
| KR | 20-0400170 | 11/2005 |
| KR | 10-0849863 | 8/2008 |
| KR | 10-2011-0037343 | 4/2011 |
| KR | 10-1525228 | 6/2015 |
| KR | 10-2015-0134678 | 12/2015 |
| KR | 10-1708403 | 2/2017 |
| WO | WO | 3/2022 |
| | PCT/US20/052568 | |

OTHER PUBLICATIONS

WO PCT/US20/052568 Written Opin., dated Jan. 29, 2021, Battelle Memorial Institute.

* cited by examiner

PLANT SUPPLEMENT DELIVERY ASSEMBLIES, AND METHODS FOR DELIVERING PLANT SUPPLEMENTS

CROSS REFERENCE TO RELATED APPLICATION

This application claims priority to and the benefit of U.S. Provisional Patent Application Ser. No. 62/906,486 filed Sep. 26, 2019, entitled "Pressure Multiplying Delivery System for Materials of Varying Viscosities", the entirety of which is incorporated by reference herein.

STATEMENT AS TO RIGHTS TO DISCLOSURES MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to plant supplement delivery and more specifically to plant supplement delivery assemblies and methods for delivering plant supplements.

BACKGROUND

Delivery of desired materials such as medications to a desired location is an ongoing need in a variety of fields of endeavor. This is particularly true in agricultural and horticultural applications when a need exists to deliver plant supplement materials such as vitamins, nutrients, plant growth regulators, pesticides and other materials to particular plants (e.g., trees, vines, and shrubs) and other locations. While a variety of application methods have been developed, there are also a variety of problems and complications that need to be addressed.

For example, a variety of methods for delivering plant supplement materials to trees have been developed wherein a tree is tapped with a boring tool and a delivery device is connected to a boring insert. These plant supplement materials, typically in the form of a liquid or gel suspension, are then delivered through this boring insert into the trunk of the tree.

There are a number of ways in which these liquid or gel suspensions can be delivered to the tree. However, these different ways can be problematic. For example, the device may be negatively impacted by heat, cold, chemical interaction and other factors and as a result may lose its efficacy, have a negative reaction with materials to be delivered, or otherwise fail to properly deliver the materials in a way so as to provide optimum benefit to the plants. Furthermore, materials of differing chemical composition or differing viscosities may require different features than those provided by these generally unmodifiable systems. Hence there is a need for a plant supplement delivery assembly/system that is low enough in cost to dispose of, robust enough to be recycled/reused, and which provides for simple and straightforward modification and delivery of a wide variety of materials. The present disclosure provides descriptions of embodiments of plant supplement delivery assemblies/systems that provide significant advantages over the previous devices/methods.

SUMMARY

Plant supplement delivery assemblies are provided that can include a housing having exterior sidewalls defining a chamber; an insert received within the chamber of the housing, the insert having collapsible insert sidewalls complimentary to the exterior sidewalls of the housing, the collapsible insert sidewalls defining at least a portion of a container configured to house a plant supplement. The delivery assemblies can further include a releasably biased member within the housing and operably aligned to forcibly engage the container upon release.

Plant supplement delivery inserts are also provided. The inserts can include collapsible sidewalls extending between a discharge end and a butt end to define a container configured to house plant supplement. The butt end can be configured to operably engage a biased member, and the insert can further include a stem extending from the discharge end. The stem can define a conduit in fluid communication with the container.

Methods for providing plant supplements are also provided. The methods can include operably engaging a biased member with a butt end of a container to collapse sidewalls of the container and provide plant supplement from the container through a stem into a plant.

Methods for recycling components of a plant supplement delivery assembly are also provided. The methods can include after providing plant supplements from an insert of a plant supplement delivery assembly, removing the spent insert from the assembly and replacing the spent insert with a sealed insert.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
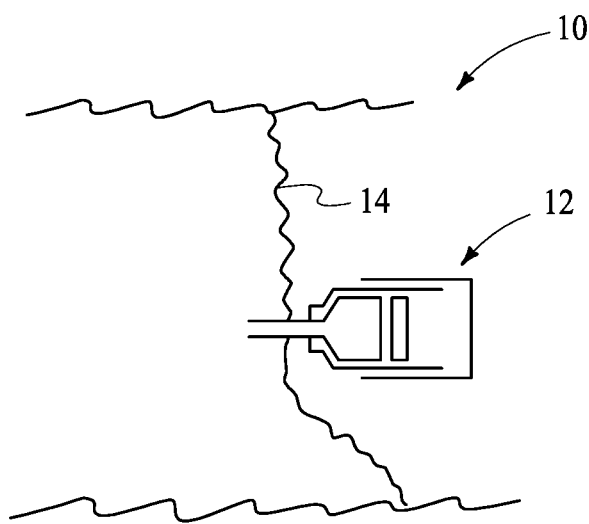
FIG. 1 is a depiction of a plant supplement delivery assembly engaged with a plant according to an embodiment of the disclosure.

The present disclosure will be described with reference to FIGS. 1-17. Referring first to FIG. 1, according to an example implementation 10, a plant 14 is operably engaged with a plant supplement delivery assembly 12. As can be seen, at least a portion of the plant supplement delivery assembly 12 is engaged with a portion of the plant 14. This engagement can be operable to deliver a plant supplement. Plant 14 can be a tree, vine, or shrub, for example, or any other plant that is appropriately supplemented with plant supplement material. The plant supplement material can be in the form of a liquid. The liquid can be flowable/pourable and/or the liquid may be more viscous and take the form of a gel or dissolvable solid.

The plant supplement material can include, but is not limited to, for example: nutrients, pesticides, herbicides, water, vitamins, plant growth regulators, fungicides, bactericides, and/or other materials and can be of any viscosity, including what may be referred to as gels, soft solids or other liquid configurations so long as the material, when under a sufficient preselected pressure can be expelled from insert 16. The plant supplement material can include but is not limited to, for example, DMSO, Tetrahydrofuran, Paraffin, Ethyl acetate, Butyl lactate, Acetonitrile, Methylated seed oils, Glycol ethers, Aromatic hydrocarbons, Methyl salicylate, and/or Dlimonene. Plant supplement material can also include, but is not limited to, for example: abamectin, dinotefuran, imidacloprid, tebuconazole, ebamectin benzoate, emamectin benzoate, and/or oxytetracycline. The plant supplement materials may have an organic solvent (combined or alone) percentage above 70%. The solvents can include, but are not limited to, for example: THFA (Tetrahydrofurfuryl alcohol), N-Methyl pyrrolidone, DMSO+N-Methyl pyrrolidone, Ethyl lactate, and/or Propylene Glycol. Additionally, the plant supplement material can include, but is not limited to, for example surfactants, magnesium oxide, and/or anti-oxidants. One or more of these constituents can be provided using assembly 12. Alternatively, the plant supplemental material may have an aqueous based solution, with a composition of water or buffer >70%.

As explained more fully in the lists that follow, the plant supplement material used in the scope of this disclosure may include one or more of any of the following agrochemicals, immune promoting/stimulating polypeptides, growth and health promoting polypeptides (e.g., immune promoting polypeptides such as recovery enzyme mixtures used in citrus applications), osmoprotectants, betaines, prolines, fertilizers, buffering agents, stability aids, preservatives, surfactants, wetting agents, humectants, agriculturally acceptable carriers, biostimulants, and/or pesticides.

Agrochemicals:

The agrochemical can include, but is not limited to, a preservative, a buffering agent, a wetting agent, a surfactant, a coating agent, a monosaccharide, a polysaccharide, an abrading agent, a pesticide, an insecticide, an herbicide, a nematicide, a bactericide, a fungicide, a miticide, a fertilizer, a biostimulant, a colorant, a humectant, an osmoprotectant, an antibiotic, an amino acid, a biological control agent, fungal control agent, a plant growth regulator, a plant protectant, a plant immune stimulator agent, an enzyme, or a combination thereof.

Immune Promoting/Stimulating Polypeptides:

Immune promoting polypeptides are provided which can be delivered in agricultural formulations. The polypeptides can be applied to crops to achieve agronomically desirable outcomes such as enhanced phenotypes in plants (e.g., those that exhibit protection against pest, disease agents and abiotic stress), increased plant growth, productivity and yield.

Osmoprotectants:

Betaines:

The betaine can comprise glycine betaine, glycine betaine aldehyde, β-alanine betaine, betaine hydrochloride, cetyl betaine, proline betaine, choline-O-sulfate betaine, cocamidopropyl betaine, oleyl betaine, sulfobetaine, lauryl betaine, octyl betaine, caprylamidopropyl betaine, lauramidopropyl betaine, isostearamidopropyl betaine, or a combination, homolog, or analog of any thereof.

For example, the betaine can comprise glycine betaine, glycine betaine aldehyde, β-alanine betaine, betaine hydrochloride, cetyl betaine, choline-O-sulfate betaine, cocamidopropyl betaine, oleyl betaine, sulfobetaine, lauryl betaine, octyl betaine, caprylamidopropyl betaine, lauramidopropyl betaine, isostearamidopropyl betaine, or a combination, homolog, or analog of any thereof.

The betaine can be derived from a plant source such as wheat (e.g., wheat germ or wheat bran) or a plant of the genus *Beta* (e.g., *Beta vulgaris* (beet)).

The betaine homolog or analog can comprise ectoine, choline, phosphatidylcholine, acetylcholine, cytidine disphosphate choline, dimethylethanolamine, choline chloride, choline salicylate, glycerophosphocholine, phosphocholine, a sphingomyelin, choline bitartrate, propio betaine, decanol betaine, homodeanol betaine, homoglycerol betaine, diethanol homobetaine, triethanol homobetaine, or a combination of any thereof.

Prolines:

The proline can comprise L-proline, D-proline, hydroxyproline, hydroxyproline derivatives, proline betaine, or a combination, derivative, homolog, or analog of any thereof.

The proline homolog or analog can comprise α-methyl-L-proline, α-benzyl-L-proline, trans-4-hydroxy-L-proline, cis-4-hydroxy-L-proline, trans-3-hydroxy-L-proline, cis-3-hydroxy-L-proline, trans-4-amino-L-proline, 3,4-dehydro-α-proline, (2S)-aziridine-2-carboxylic acid, (2S)-azetidine-2-carboxylic acid, L-pipecolic acid, proline betaine, 4-oxo-L-proline, thiazolidine-2-carboxylic acid, (4R)-thiazolidine-4-carboxylic acid, or a combination of any thereof.

Fertilizers:

The fertilizer can comprise a liquid fertilizer or a dry fertilizer.

The agrochemical can include a fertilizer. The fertilizer can comprise ammonium sulfate, ammonium nitrate, ammonium sulfate nitrate, ammonium chloride, ammonium bisulfate, ammonium polysulfide, ammonium thiosulfate, aqueous ammonia, anhydrous ammonia, ammonium polyphosphate, aluminum sulfate, calcium nitrate, calcium ammonium nitrate, calcium sulfate, calcined magnesite, calcitic limestone, calcium oxide, calcium nitrate, dolomitic limestone, hydrated lime, calcium carbonate, diammonium phosphate, monoammonium phosphate, magnesium nitrate, magnesium sulfate, potassium nitrate, potassium chloride, potassium magnesium sulfate, potassium sulfate, sodium nitrates, magnesium limestone, magnesia, urea, urea-formaldehydes, urea ammonium nitrate, sulfur-coated urea, polymer-coated urea, isobutylidene diurea, $K_2SO_4$—$Mg_2SO_4$, kainite, sylvinite, kieserite, Epsom salts, elemental sulfur, any combination thereof.

The agrochemical can comprise a micronutrient fertilizer material, the micronutrient fertilizer material comprising boric acid, a borate, a boron frit, copper sulfate, a copper frit, a copper chelate, a sodium tetraborate decahydrate, an iron sulfate, an iron oxide, iron ammonium sulfate, an iron frit, an iron chelate, a manganese sulfate, a manganese oxide, a manganese chelate, a manganese chloride, a manganese frit, a sodium molybdate, molybdic acid, a zinc sulfate, a zinc oxide, a zinc carbonate, a zinc frit, zinc phosphate, a zinc chelate, or any combination thereof.

The fertilizer can comprise nitrogen, phosphate (e.g., monoammonium phosphate, diammonium phosphate, orthophosphate, orthopolyphosphate, or a combination of any thereof), potassium (e.g., potassium acetate), zinc, iron, selenium, boron, copper, or a combination of any thereof.

Buffering Agents:

Buffering agents include phosphate buffer, acetate buffer, citrate buffer, phosphate-citrate buffer, glycine buffer, sodium acetate buffer, sodium phosphate buffer, potassium, phosphoric acid, a phosphate salt, citric acid, a citrate salt, a sulfate salt, MOPS, or HEPES.

Stability Aids:

Suitable stability aids include but are not limited to dextrose, ammonium sulfate, polyethylene glycol and glycine betaine.

Preservatives:

Suitable preservatives include all preservatives typically used in agricultural compositions, such as, for example, a preservative made from dichlorophen and benzyl alcohol hemiformal. Other suitable preservatives include 1,2-benzisothiazolin-3,1,2-benzisothiazolin-3-one, 5-chloro-2-methyl-4-isothiazolin-3-one, 2-methyl-4-isothiazolin-3-one, or a combination of any thereof.

As further examples, suitable preservatives include MIT (2-methyl-4-isothiazolin-3-one), BIT (1,2-benzisothiazolin-3-one, and dipropylene glycol), 5-chloro-2-(4-chlorobenzyl)-3(2H)-isothiazolone, 5-chloro-2-methyl-2H-isothiazol-3-one, 5-chloro-2-methyl-2H-isothiazol-3-one, 5-chloro-2-methyl-2Hisothiazol-3-one-hydrochloride, 4,5-dichloro-2-cyclohexyl-4-isothiazolin-3-one, 4,5-dichloro-2-octyl-2H-isothiazol-3-one, 2-methyl-2H-isothiazol-3-one, 2-methyl-2Hisothiazol-3-one-calcium chloride complex, 2-octyl-2H-isothiazol-3-one, benzyl alcohol hemiformal, and or other broad spectrum preservatives and biocides, or any combination thereof.

Surfactants:

Nonionic surfactants include polyethylene oxide-polypropylene oxide block copolymers, polyethylene-polypropylene glycol, alkylpolyoxyethylene, polyethylene glycol ethers of linear alcohols, reaction products of fatty acids with ethylene oxide and/or propylene oxide, polyvinyl alcohol, polyvinylpyrrolidone, copolymers of polyvinyl alcohol and polyvinylpyrrolidone, copolymers of (meth)acrylic acid and (meth)acrylic esters, alkyl ethoxylates, alkylaryl ethoxylates, which may be optionally phosphated or neutralized with a based, poloxamine derivatives, nonylphenol ethoxylates, and a mixture any thereof.

Anionic surfactants include, for example, alkali metal and alkaline earth metal salts of alkylsulfonic acid and alkylarylsulfonic acid, salts of polystyrenesulfonic acid, salts of polyvinyl sulfonic acids, salts of naphthalene sulfonic acid, formaldehyde condensates, salts of condensates of naphthalenesulfonic acid, phenolsulfonic acid and formaldehyde, salts of lignosulfonic acid, and a mixture any thereof.

The surfactant can comprise an alkyl carboxylate, sodium stearate, sodium lauryl sarcosinate, perfluorononanoate, perfluorooctanoate, ammonium lauryl sulfate, sodium lauryl sulfate, sodium laureth sulfate, sodium myreth sulfate, docusate, perfluorooctanesulfonate, perfluorobutanesulfonate, an alkyl-aryl ether phosphate, an alkyl ether phosphate, octenidine dihydrochloride, cetrimonium bromide, cetylpyridinium chloride, benzalkonium chloride, benzethonium chloride, dimethyldioctadecylammonium chloride, dioctadecyldimethylammonium bromide, 3-[(3-cholamidopropyl) dimethylammonio]-1-propanesulfonate, cocamidopropyl hydroxysultaine, cocamidopropyl betaine, phosphatidylserine, phosphatidylethanolamine, phosphatidylcholine, a sphingomyelin, a fatty alcohol, cetyl alcohol, stearyl alcohol, cetostearyl alcohol, oleyl alcohol, a polyoxyethylene glycol alkyl ether, octaethylene glycol monodecyl ether, pentamethylene glycol monodecyl ether, a polyoxypropylene glycol alkyl ether, a glucoside alkyl ether, decyl glucoside, lauryl glucoside, octyl glucoside, polyoxyethylene glycol octylphenol ether, an alkylene glycol, such as ethylene glycol, propylene glycol, polyethylene glycol, alkyl and alkyl lauryl polyoxyethylene glycol, an alkyl polysaccharide, an alkyl polyglucoside ester, polyethylene-polypropylene glycol, polyoxyethylene-polyoxypropylene and polyethylene glycol, hexylene glycol, and polyoxyethylene glycol alkylphenol ether, nonoxynol-9, a glycerol alkyl ester, glyceryl laurate, a polyoxyethylene glycol sorbitan alkyl ester, polysorbate, a sorbitan alkyl ester, cocamide monoethanolamine, cocamide diethanolamine, dodecyldimethylamine oxide, a block copolymer of polyethylene glycol, a block copolymer of polypropylene glycol, poloxamer, polyethoxylated tallow amine, a polyoxyalkylene or derivative thereof, such as alkyl polyoxyethylene, methoxypolyoxyethylene, octyl polyoxyethylene, nonyl polyoxyethylene, decyl polyoxyethylene, undecyl polyoxyethylene, lauryl polyoxyethylene, tridecyl polyoxyethylene, tetradecyl polyoxyethylene, pentadecyl polyoxyethylene, hexadecyl polyoxyethylene, heptadecyl polyoxyethylene, octadecyl polyoxyethylene, coco polyoxyethylene, tallow polyoxyethylene, alkyl polyethoxylate ether, alkyl phenol ethoxylate, and a polyoxyethylene-polyoxypropylene block copolymer, an organosilicone, an alcohol ethoxylate, an alkyl aryl ethoxylate, a sulfosuccinic acid-based surfactant, or a combination of any thereof.

Wetting Agents:

The wetting agent can comprise organosilicones, polyoxyethoxylates, polysorbates, polyethylene glycol and derivatives thereof, ethoxylates, crop oils, and polysaccharides.

Humectants:

The humectant can comprise: glycerol, glycerin, a glycerol derivative (e.g. glycerol monosterate, glycerol triacetate, triacetin, propylene glycol, hexylene glycol, or butylene glycol), triethylene glycol, tripolypropylene glycol, glyceryl triacetate, sucrose, tagatose, a sugar alcohol or a sugar polyol (e.g glycerol, sorbitol, xylitol, mannitol, or manitol), a polymeric polyol (e.g. polydextrose, a collagen, an aloe or an aloe vera gel), or an alpha hydroxy acid (e.g.

lactic acid, honey, molasses, *quillaia*, sodium hexametaphosphate, lithium chloride or urea). Synthetic humectants can also comprise: butylene glycol, and *tremella* extract.

Enzymes:

The enzyme can comprise an enzyme that takes action on a plant tissue, acts on a nutrient source, acts on a plant pathogen, acts as a plant growth regulator, acts on a plant biochemical or polysaccharide, or acts as a pesticide.

Agriculturally Acceptable Carriers:

The agriculturally acceptable carrier can comprise a dispersant, a surfactant, an additive, water, a thickener, an anti-caking agent, residue breakdown product, an oil, a coloring agent, a stabilizer, a preservative, a polymer, a coating, or a combination thereof.

The additive can comprises an oil, a gum, a resin, a clay, a polyoxyethylene glycol, a terpene, a viscid organic, a fatty acid ester, a sulfated alcohol, an alkyl sulfonate, a petroleum sulfonate, an alcohol sulfate, a sodium alkyl butane diamante, a polyester of sodium thiabutane dioate, a benzene acetonitrile derivative.

Biostimulants:

When the composition includes a biostimulant, the biostimulant can comprise a seaweed extract, an elicitor, a polysaccharide, a monosaccharide, a protein extract, a soybean extract, a humic acid, a plant hormone, a plant growth regulator, or any combination thereof.

Pesticides

When the composition includes a pesticide, the pesticide can comprise an insecticide, a herbicide, a fungicide, a bactericide, a nematicide, a miticide, or any combination thereof.

When the composition includes an insecticide, the insecticide can comprise clothianidin, imidacloprid, an organophosphate, a carbamate, a pyrethroid, an acaricide, an alkyl phthalate, boric acid, a borate, a fluoride, sulfur, a haloaromatic substituted urea, a hydrocarbon ester, a biologically-based insecticide, or any combination thereof. For example, the insecticide can comprise clothianidin or imidacloprid.

The agrochemical can comprise an herbicide. The herbicide can comprise 2,4-D, 2,4-DB, acetochlor, acifluorfen, alachlor, ametryn, atrazine, aminopyralid, benefin, bensulfuron, bensulfuron methyl bensulide, bentazon, bispyribac sodium, bromacil, bromoxynil, butylate, carfentrazone, chlorimuron, 2-chlorophenoxy acetic acid, chlorsulfuron, chlorimuron ethyl, clethodim, clomazone, clopyralid, cloransulam, CMPP-P-DMA, cycloate, DCPA, desmedipham, dicamba, dichlobenil, diclofop, 2,4-dichlorophenol, dichlorophenoxyacetic acid, dichlorprop, dichlorprop-P, diclosulam, diflufenzopyr, dimethenamid, dimethyl amine salt of 2,4-dichlorophenoxyacetic acid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fluorxypyr 1-methyleptylester, fomesafen, fomesafen sodium salt, foramsulfuron, glufosinate, glufosinate-ammonium, glyphosate, halosulfuron, halosulfuron-methyl, hexazinone, 2-hydroxyphenoxy acetic acid, 4-hydroxyphenoxy acetic acid, imazamethabenz, imazamox, imazapic, imazaquin, imazethapyr, isoxaben, isoxaflutole, lactofen, linuron, mazapyr, MCPA, MCPB, mecoprop, mecoprop-P, mesotrione, metolachlor-s, metribuzin, metsulfuron, metsulfuron-methyl, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, pyroxasulfone, quinclorac, quizalofop, rimsulfuron, sethoxydim, siduron, simazine, sulfentrazone, sulfometuron, sulfosulfuron, tebuthiuron, terbacil, thiazopyr, thifensulfuron, thifensulfuron-methyl, thiobencarb, tralkoxydim, triallate, triasulfuron, tribenuron, tribernuron-methyl, triclopyr, trifluralin, triflusulfuron, or any combination thereof.

When the composition includes a nematicide, the nematicide can comprise fluopyram, antibiotic nematicides such as abamectin; carbamate nematicides such as acetoprole, chloropicrin, benclothiaz, benomyl, carbofuran, carbosulfan, and chloethocarb; dazomet, DBCP, DCIP, alanycarb, aldicarb, aldoxycarb, oxamyl, diamidofos, fenamiphos, fosthietan, phosphamidon, cadusafos, chlorpyrifos, dichlofenthion, dimethoate, ethoprophos, fensulfothion, fosthiazate, harpins, heterophos, imicyafos, isamidofos, isazofos, methomyl, mecarphon, phorate, phosphocarb, terbufos, thionazin, triazophos, tioxazafen, dazomet, 1,2-dichloropropane, 1,3-dichloropropene, furfural, iodomethane, metam, methyl bromide, methyl isothiocyanate, xylenol, or any combination thereof.

When the composition includes a bactericide, the bactericide can comprise streptomycin, penicillins, tetracyclines, oxytetracycline, kasugamycin, ampicillin, oxolinic acid, chlorotetracycline, copper oxide, or any combination thereof. For example, the bactericide can comprise oxytetracycline.

The agrochemical can include a fungicide. The fungicide can comprise aldimorph, ampropylfos, ampropylfos potassium, andoprim, anilazine, azaconazole, azoxystrobin, benalaxyl, benodanil, benomyl, benzamacril, benzamacril-isobutyl, benzovindiflupyr, bialaphos, binapacryl, biphenyl, bitertanol, blasticidin-S, boscalid, bromuconazole, bupirimate, buthiobate, calcium polysulphide, capsimycin, captafol, captan, carbendazim, carvon, quinomethionate, chlobenthiazone, chlorfenazol, chloroneb, chloropicrin, chlorothalonil, chlozolinate, clozylacon, cufraneb, cymoxanil, cyproconazole, cyprodinil, cyprofuram, debacarb, dichlorophen, diclobutrazol, diclofluanid, diclomezine, dicloran, diethofencarb, dimethirimol, dimethomorph, dimoxystrobin, diniconazole, diniconazole-M, dinocap, diphenylamine, dipyrithione, ditalimfos, dithianon, dodemorph, dodine, drazoxolon, edifenphos, epoxiconazole, etaconazole, ethirimol, etridiazole, famoxadone, fanapanel, fenarimol, fenbuconazole, fenfuram, fenitropan, fenpiclonil, fenpropidin, fenpropimorph, fentin acetate, fentin hydroxide, ferbam, ferimzone, fluazinam, fludioxonil, flumetover, fluoromide, fluoxastrobin fluquinconazole, flurprimidol, flusilazole, flusulfamide, flutolanil, flutriafol, folpet, fosetyl-aluminium, fosetyl-sodium, phthalide, fuberidazole, furalaxyl, furametpyr, furcarbonil, furconazole, furconazole-cis, furmecyclox, guazatine, hexachlorobenzene, hexaconazole, hymexazole, imazalil, imibenconazole, iminoctadine, iminoctadine albesilate, iminoctadine triacetate, iodocarb, iprobenfos (IBP), iprodione, irumamycin, isoprothiolane, isovaledione, kasugamycin, kresoxim-methyl, copper preparations, such as: copper hydroxide, copper naphthenate, copper oxychloride, copper sulphate, copper oxide, oxine-copper and Bordeaux mixture, mancopper, mancozeb, maneb, meferimzone, mepanipyrim, mepronil, metconazole, metalzxyl, methasulfocarb, methfuroxam, metiram, metomeclam, metsulfovax, mildiomycin, myclobutanil, myclozolin, nickel dimethyldithiocarbamate, nitrothal-isopropyl, nuarimol, ofurace, oxadixyl, oxamocarb, oxolinic acid, oxycarboxim, oxyfenthiin, paclobutrazole, pefurazoate, penconazole, pencycuron, phosdiphen, picoxystrobin, pimaricin, piperalin, polyoxin, polyoxorim, probenazole, prochloraz, procymidone, propamocarb, propanosine-sodium, propiconazole, propineb, prothioconazole, pyrazophos, pyrifenox, pyrimethanil, pyroquilon, pyroxyfur, quinconazole, quintozene (PCNB), a strobilurin, sulphur and sulphur preparations, tebuconazole, tecloftalam, tecnazene, tetcyclasis, tetraconazole, thiabendazole, thicyofen, thifluzamide, thiophanate-methyl, tioxymid, tolclofos-methyl, tolylfluanid, triadimefon, triadimenol, triazbutil, a triazole, triazoxide, trichlamide, tricyclazole, triclopyr, tridemorph, trifloxystrobin, triflumizole, triforine, uniconazole, validamycin A, vinclozolin, viniconazole, zarilamide, zineb, ziram The strobilurin fungicide can comprise a Strobilurin A, a Strobilurin B, a Strobilurin C, a Strobilurin D, a Strobilurin E, a Strobilurin F, a Strobilurin G, a Strobilurin H, an Azoxystrobin, a Trifloxystrobin, a Kresoxim methyl, a Fluoxastrobin, Picoxystrobin, or any combination thereof.

The strobilurin fungicide can comprise a non-naturally occurring strobilurin fungicide such as an Azoxystrobin, a Trifloxystrobin, a Kresoxim methyl, a Fluoxastrobin, or any combination thereof. For example, the strobilurin fungicide can comprise a Trifloxystrobin, Fluoxastrobin or Picoxystrobin. Strobilurin fungicides are used to control a range of fungal diseases, including water molds, downy mildews, powdery mildews, leaf spotting and blighting fungi, fruit rotters, and rusts. They are useful for treating a variety of crops, including cereals, field crops, fruits, tree nuts, vegetables, turfgrasses, and ornamentals.

The triazole fungicide can comprise prothioconazole, imidazole, imidazol, prochloraz, propiconazole, triflumizole, diniconazole, flusilazole, penconazole, hexaconazole, cyproconazole, myclobutanil, tebuconazole, difenoconazole, tetraconazole, fenbuconazole, epoxiconazole, metconazole, fluquinconazole, triticonazole, or any combination thereof.

The bioactive priming polypeptides can be delivered in combination with strobilurins and triazole fungicides, especially fluoxastrobin or trifloxystrobin in combination with prothioconazole.

In addition, the fungicide can comprise azoxystrobin, carboxin, difenoconazole, fludioxonil, fluxapyroxad, ipconazole, mefenoxam, pyraclostrobin, silthiofam, sedaxane, thiram, triticonazole or any combination thereof.

Figure 2:
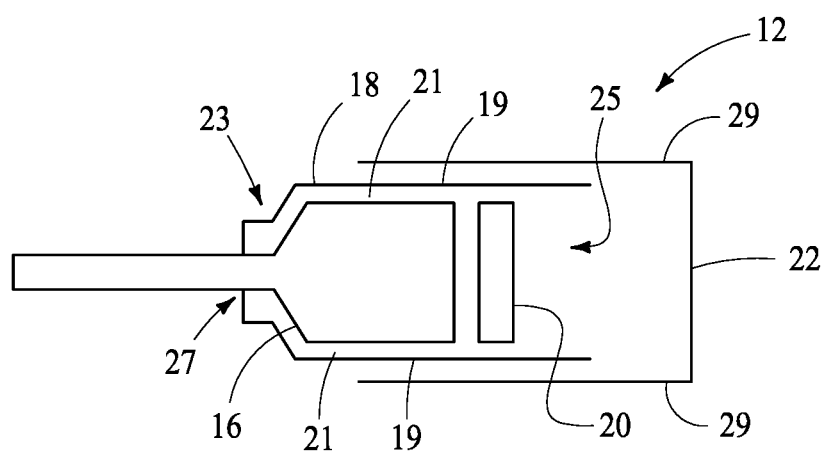
FIG. 2 is a depiction of a plant supplement delivery assembly according to an embodiment of the disclosure.

Referring to FIG. 2, a plant supplement delivery assembly 12 is shown in more detail that includes a plant supplement delivery insert 16 engaged within a housing 18 and operably arranged with a releasably biased member 20 as well as a sheath 22. In accordance with example implementations, housing 18 can have exterior sidewalls 19 defining a chamber 21 and exterior sidewalls 19 of chamber 21 can extend between a nose end 23 and insert receiving end 25.

Nose end 23 can define an opening 27 configured to receive a portion of insert 16. In accordance with other example implementations, housing 18 can define a nose sheath configured to receive a stem portion of the insert 16. In accordance with additional implementations which will be described later, housing 18 can define a recess configured to receive a portion of insert 16. This portion can be a flange, for example.

In accordance with example implementations, assembly 12 can include a sheath 22 configured to operably engage housing 18. Sheath 22 can have sidewalls 29 extended from a rim of an opening to a head end. In accordance with example implementations, the sheath can fixedly engage with housing 18, for example. Operably engaged with the releasably biased member 20 can be a biasing mechanism such as a spring, for example. Spring configurations can be leafed or coiled and/or configured to retract or extend. Other biasing mechanisms are contemplated. For example, in one or more embodiments, member 20 can be urged to administer the injection (broadly, delivery of plant supplement) by a manually driven piston, a pressurized fluid (e.g., pneumatic or hydraulic fluid), an electronic or motor-drive actuator.

Figure 3:
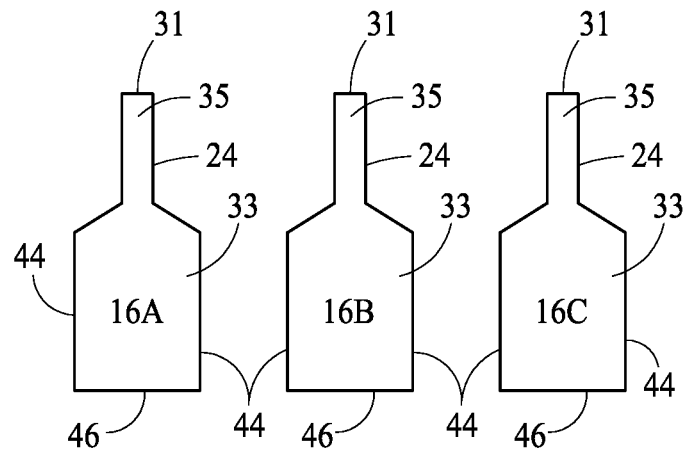
FIG. 3 is a depiction of a set of plant supplement delivery inserts according to embodiments of the disclosure.
Figure 4:
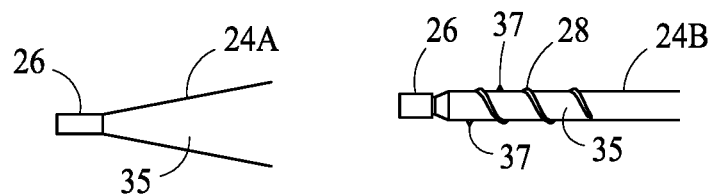
FIG. 4 is a depiction of a portion of a plant supplement insert according to an embodiment of the disclosure.
Figure 5:
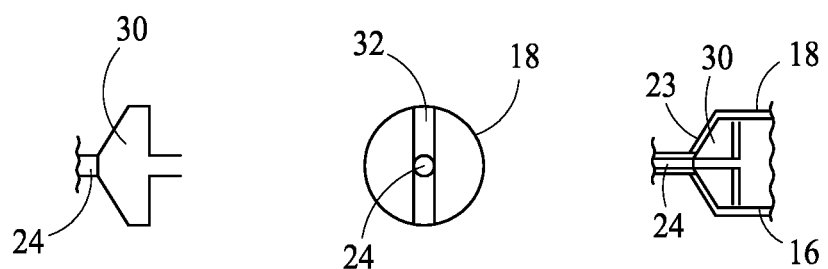
FIG. 5 is a depiction of a portion of a plant supplement insert arranged within a portion of a plant supplement delivery assembly according to an embodiment of the disclosure.

In accordance with example configurations and with reference to FIG. 3, at least three example plant delivery assembly inserts 16A, 16B, and 16C are shown. The inserts are shown in this way to demonstrate that the inserts can be coded in some form or fashion to indicate the material within the inserts themselves. Therefore, as shown, 16A, 16B, and 16C can contain different plant supplement materials. Accordingly, the amount of plant supplement materials can be different between each of the inserts shown as well. Example codes for these inserts can include color coding, number coding, the stem color may be indicative, and/or the chamber itself can be color coded to demonstrate what is contained within the plant supplement assembly insert.

The insert can include collapsible sidewalls 44 extending between a discharge end 31 and a butt end 46 to define a container 33 configured to house plant supplement. Butt end 46 can be configured to engage releasably biased member 20 (FIG. 2), for example. Additionally, the insert can include a stem 24 defining a conduit 35 in fluid communication with container 33. While sidewalls 44 are collapsible, butt end 46 may be collapsible as well. When member 20 is released, pressure is applied to insert 16 expelling plant supplement material contained within container 33 through conduit 35 and out opening 31. Member 20 collapses at least sidewalls 44 upon application of the pressure after being released.

In accordance with example implementations and with reference to FIG. 4, stem 24 can be configured as a tapered stem as shown as 24A extended to a releasable closing tip 26 or a more linear conduit 24B extending to a releasable snap release tip 26. In accordance with example implementations, stem 24 can include raised portions 28 that can facilitate threading of stem 24 within an orifice as well as additional raised portions that can include barbs 37, for example.

In accordance with example implementations and with reference to FIG. 5, insert 16 can include a flanged portion 30 that is configured to extend from stem 24 and be fixedly attached to stem 24. In accordance with example implementations, a distinction can be drawn between the material used to fabricate container 33 of insert 16 and stem 24 of insert 16, as well as flange 30. In accordance with example implementations, stem 24 and/or flange 30 can be constructed of a resilient hardened polymer that is unpliable or vastly unpliable when compared to the very pliable, crunchable or deformable materials of container 33. In accordance with example implementations, container 33, or at least the sidewalls thereof can be collapsible and deformable in relation to the materials of stem 24 and/or flange 30. This difference in pliability or hardness of the materials allows for the operator of the assembly to bore or twist at least the stem into a boring within a plant.

In general, it is contemplated that certain components of or the entirety of the plant supplement delivery assembly may be configured for one-time or disposable use. For example, the insert 16 or the entire plant supplement delivery assembly 12 may be configured for one-time or disposable use. Thus, in one or more embodiments, any of the components of any plant supplement delivery assembly disclosed herein may be formed partially or entirely of bioplastic and/or biodegradable plastic (e.g., bio-based plastics, such as polyhydroxyalkanoates, polylactic acid, starch blends, cellulose-based plastics, lignin-based polymer composites and/or petroleum-based plastics such as polyglycolic acid, polybutylene succinate, polycaprolactone, pol(vinyl alcohol) and polybutylene adipate terephthalate). In accordance with example implementations, this may reduce the environmental impact of utilizing all or part of the plant supplement delivery assembly 12 as a one-time-use or disposable device.

Referring to FIG. 5 again, a recess 32 can be within a portion of housing 18 to facilitate receiving flange 30. This recess can allow for the twisting or turning of housing 18, facilitating the turning or twisting of the stem portion of insert 16 when insert 16 is engaged within housing 18. As can be seen, in accordance with example implementations, the recess/flange coupling can be configured towards nose 23 of housing 18. It is contemplated that the recess/flange engagement can be outside of housing 18 and part of the exterior of nose 23.

Figure 6:
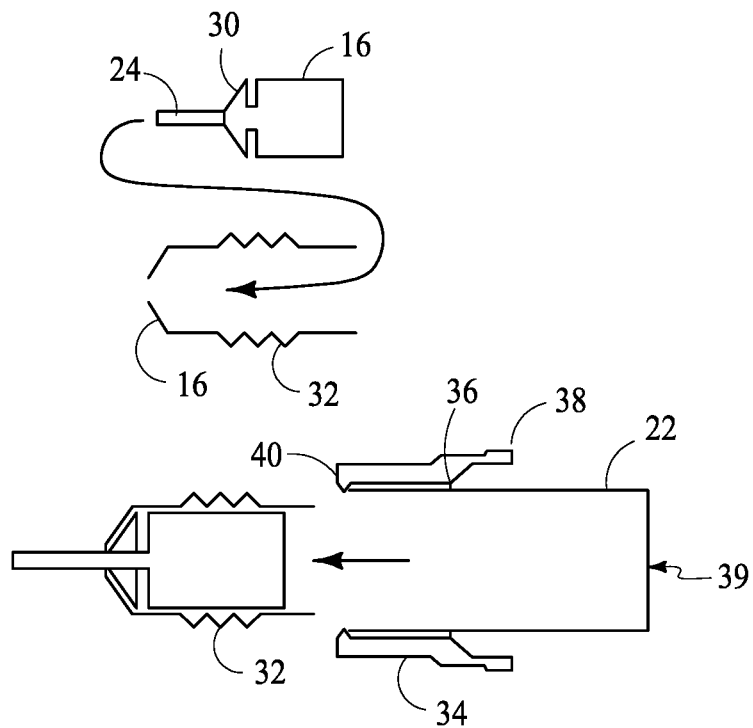
FIG. 6 is a depiction of at least one implementation of arranging an insert within a plant delivery assembly according to an embodiment of the disclosure.
Figure 7:
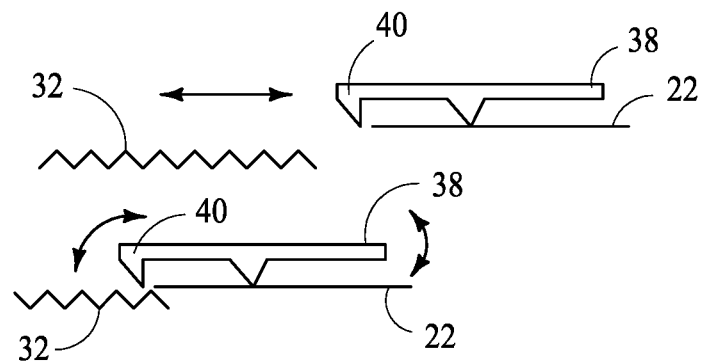
FIG. 7 is a depiction of at least one arrangement of engaging portions of a plant supplement delivery assembly according to an embodiment of the disclosure.
Figure 8:
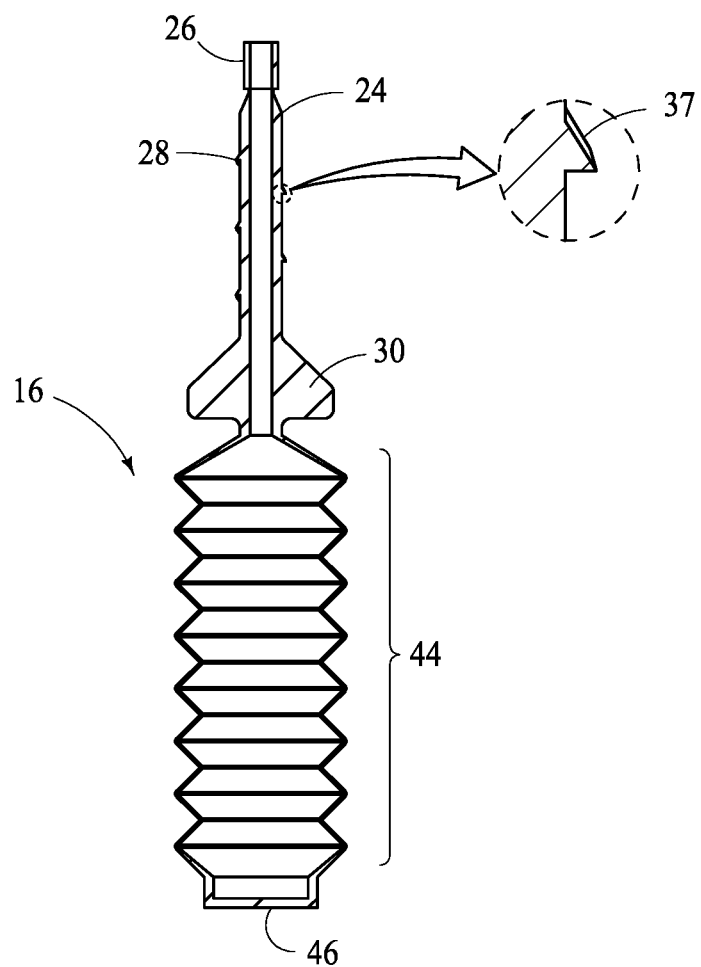
FIG. 8 is one view of a plant supplement insert according to an embodiment of the disclosure.
Figure 9:
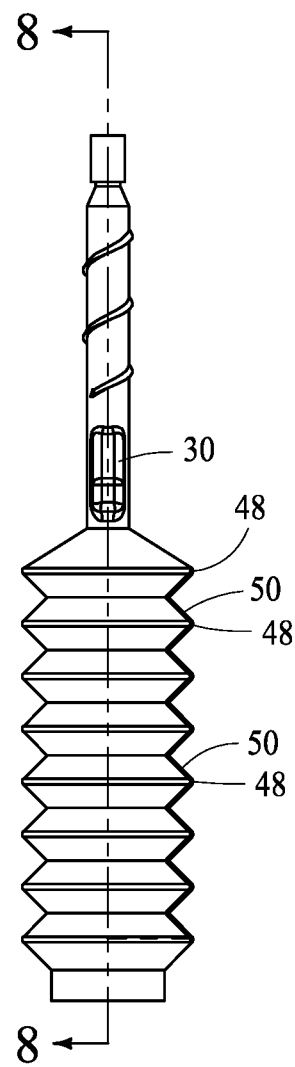
FIG. 9 is another view of a plant supplement insert according to an embodiment of the disclosure.
Figure 10:
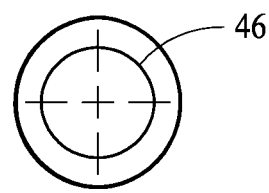
FIG. 10 is another view of a plant supplement insert according to an embodiment of the disclosure.
Figure 11:
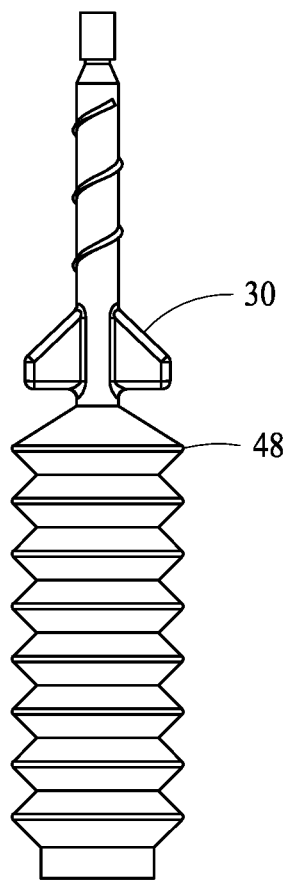
FIG. 11 is another view of a plant supplement insert according to an embodiment of the disclosure.
Figure 12:
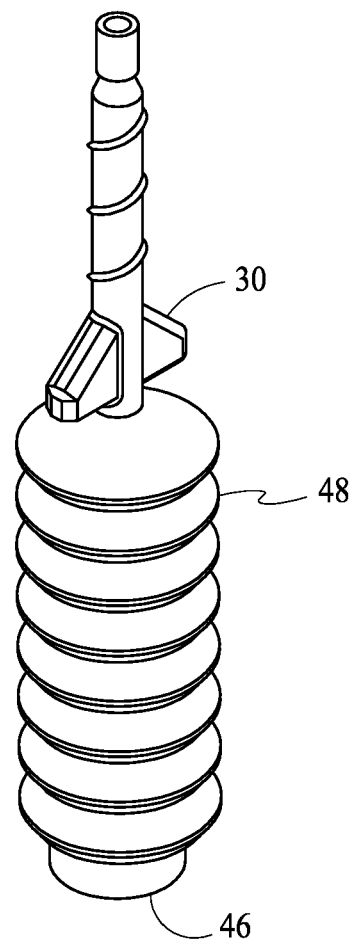
FIG. 12 is yet another view of a plant supplement insert according to an embodiment of the disclosure.

Referring next to FIGS. 6 and 7, in accordance with an example configuration, insert 16 can be provided to within housing 18, and housing 18 can be provided with sidewalls that have ratcheted or raised portions 32 configured to engage a coupling mechanism of sheath 22. In accordance with example implementations, the coupling mechanism can be a pliable or pivotable ratcheting configuration 34 that pivots upon a point 36 about a compressible end 38 to a coupling end 40. As shown in FIG. 7, coupling end 40 can be configured as teeth that engage complimentary recessed portions of 32 to fixedly engage sheath 22 in relation to housing 18. Sheath 22 can have butt end 39. End 39 can be configured to ergonomically engage the palm of an operator's hand for example. In accordance with example configurations, sheath 22 can contain a biasing mechanism such as spring that operably engages member 20 (not shown in FIG. 6). Upon slidably engaging sheath 22 with housing 18 the biasing mechanism can engage the member 20. Upon affixing sheath 22 in relation to housing 18 using the coupling mechanism, member 20 can be biased against insert 16 and plant supplement material can be expelled though conduit 24.

Referring next to FIGS. 8-12, in accordance with an example implementation, insert 16 is shown that includes collapsible sidewalls 44 configured in a bellows configuration with raised portions that slidably engage with interior of the sidewalls of housing 18. Alternative embodiments are contemplated that can include walls similar to a plastic bulb end on a plastic pipette that could be inverted to displace the fluid out of the bulb/container with a member pushing on the bulb end. As can be seen, tip 26 can be sealable upon the filling of insert 16 to seal the plant supplement material within insert 16. As shown, this tip portion can be snap removed and allow for fluid discharge from insert 16 upon release of the biased member. In accordance with example implementations, butt end 46 of the insert can be in the form of a disc to engage a plunger portion of a biasing mechanism. However, other implementations are also contemplated wherein butt end 46 may be also collapsible and the biasing member may be the non-collapsible portion collapsing the container portion of the insert. As can be seen, the bellows portion can include raised edges 48 as well as lowered or recessed edges 50.

Figure 13:
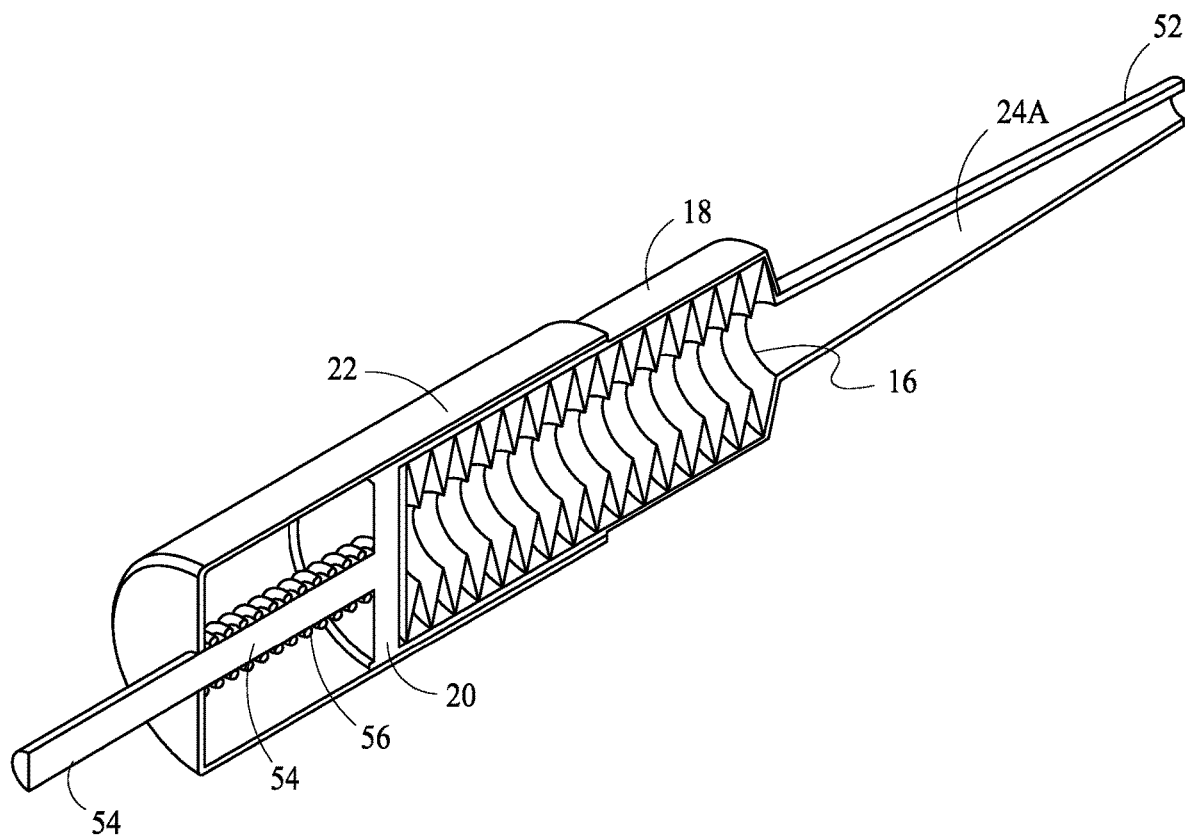
FIG. 13 is a depiction of another plant supplement delivery assembly according to an embodiment of the disclosure.
Figure 14:
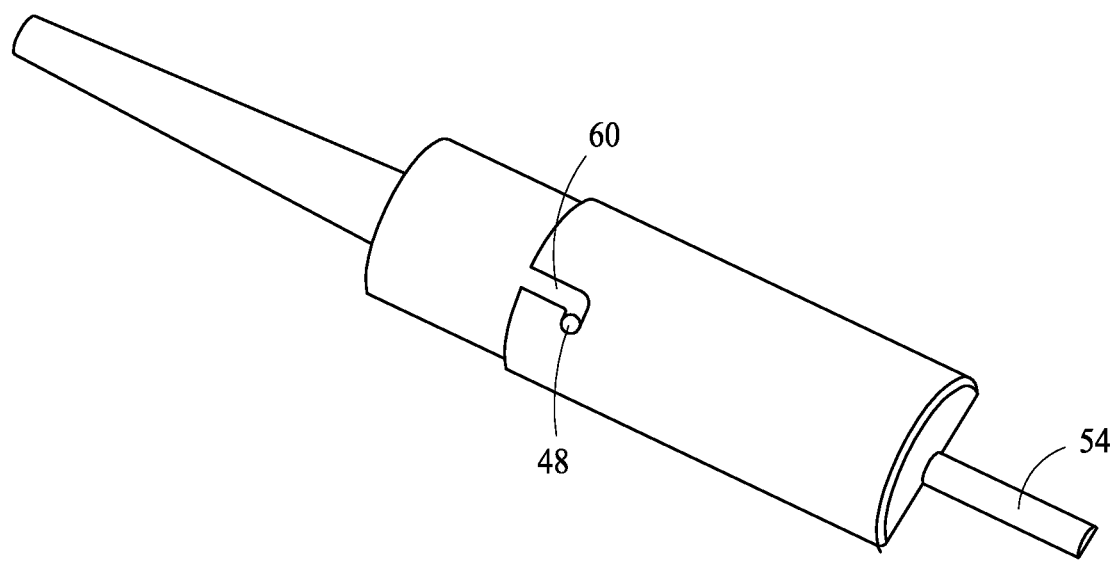
FIG. 14 is another view of the plant supplement delivery assembly according to an embodiment of the disclosure.

Turning next to FIG. 13, in accordance with another example implementation, an assembly is shown that includes an insert 16 that has a stem portion 24A that extends to a nose sheath 52 extending from housing 18. Sheath 22 can extend over or engage with housing 18. However, in this configuration, a rod 54 is engaged with releasably biased member 20 as well as a spring operably arranged about rod member 54 providing the biasing mechanism that can releasably bias member 20 in relation to insert 16. In accordance with example implementations, this releasably biased mechanism can be fixed to contain potential energy to engage the biased member. However, with reference to FIG. 14, upon twisting of sheath 22 in relation to housing 18, locking pin 48 can be released within recess 60 and allow the biasing mechanism to exert force along container 33 of insert 16.

Figure 15:
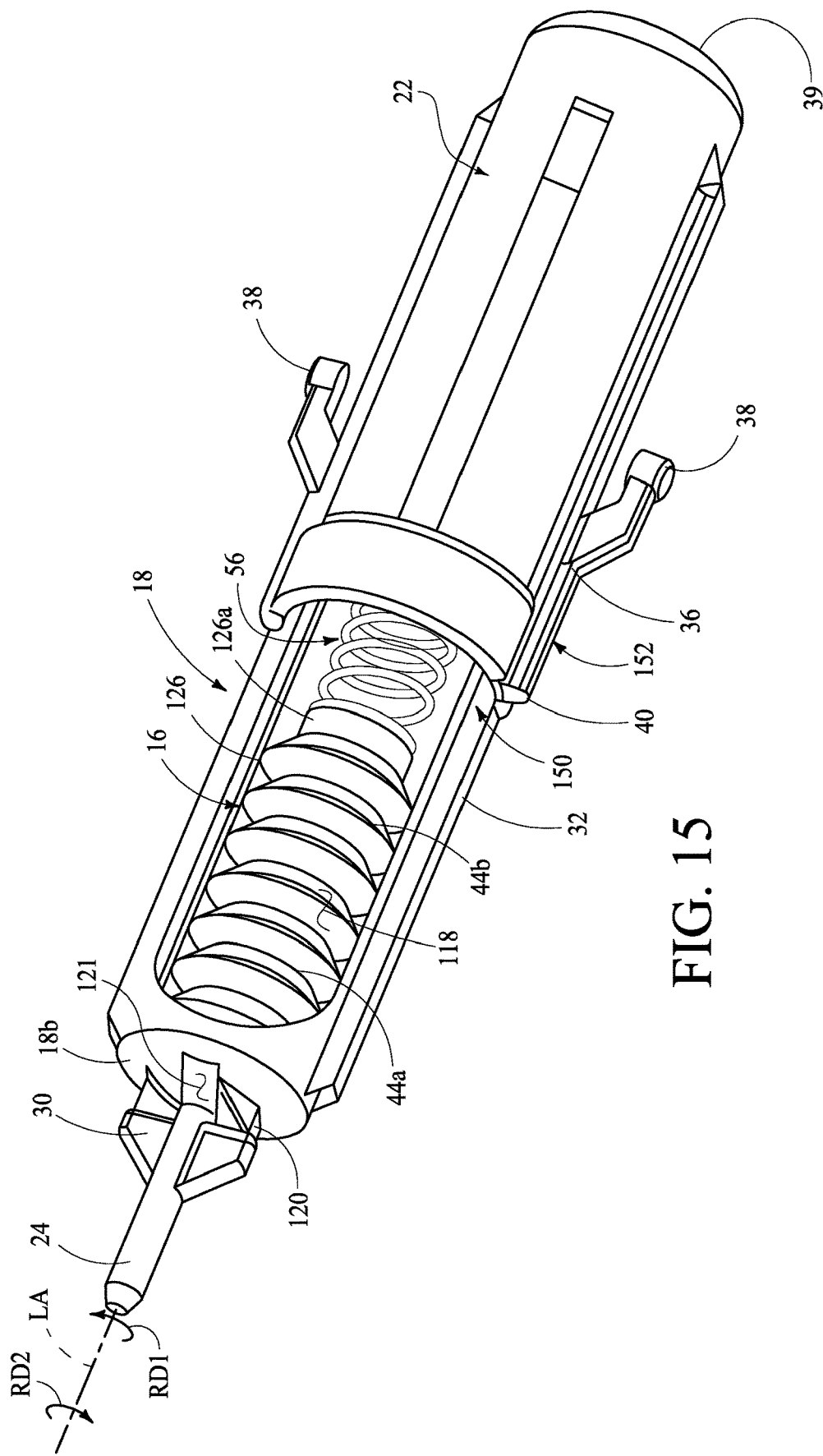
FIG. 15 is a view of a plant supplement delivery assembly according to an embodiment of the disclosure.
Figure 16:
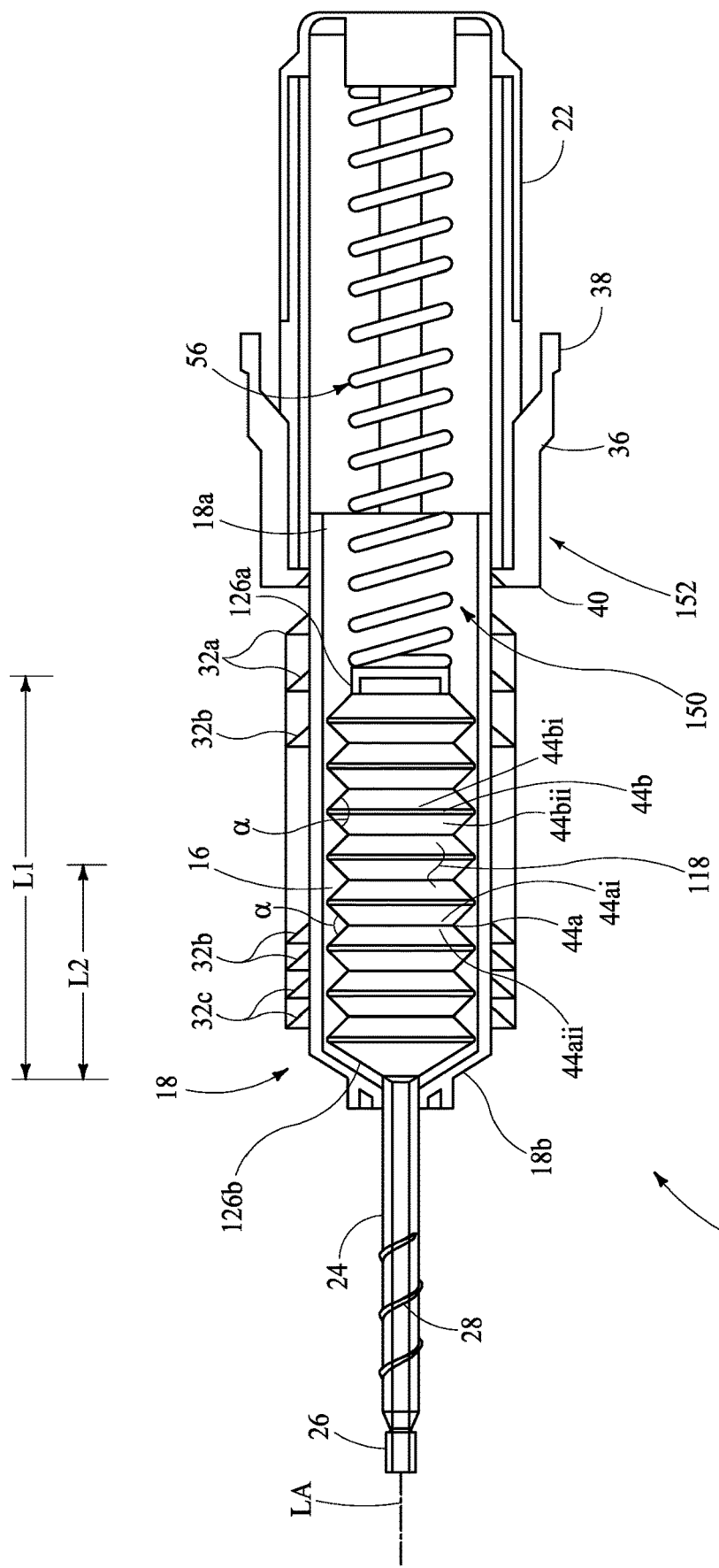
FIG. 16 is another view of the plant supplement delivery assembly of FIG. 15 according to an embodiment of the disclosure.

Referring next to FIG. 15, in accordance with yet another example implementation, assembly 12 is shown that includes insert 16 within housing 18 operably engaged with sheath 22. As can be seen here, coupling assemblies 32 and 40 can be arranged to fix sheath 22 in relation to housing 18 as well as insert 16. In accordance with example implementations, sheath 22 can include both a biasing mechanism such as a spring and a biasing member 20 can be engaged within housing 18. In accordance with example implementations, 22 can be pressed at the butt end 39 of sheath 22 to lock in relation to housing 18, thereby compressing the biasing mechanism therein to exert force against member 20 and insert 16, thereby providing for plant supplement material to be expelled from insert 16. In accordance with example implementations and with reference to FIG. 16, this embodiment is shown that depicts the insert in relation to housing 18 as well as coupling 32 and 40.

Figure 17:
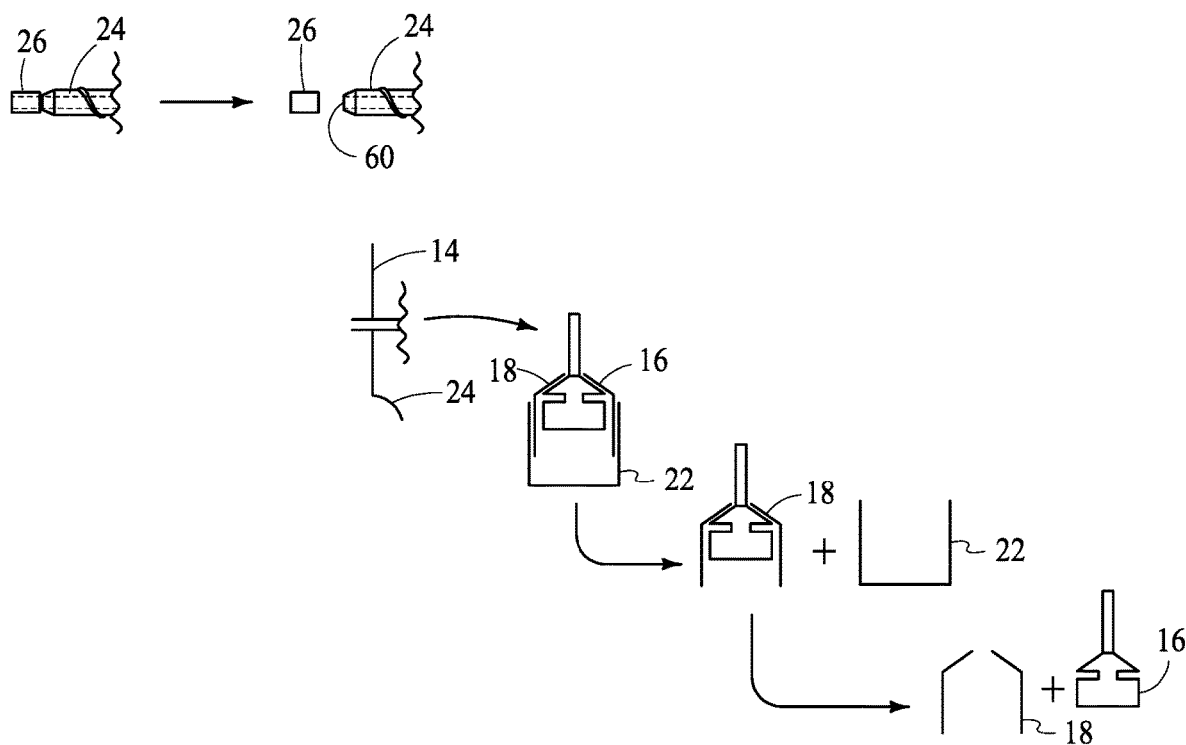
FIG. 17 is an example of one implementation of a plant supplement delivery assembly according to an embodiment of the disclosure.

Finally, with reference to FIG. 17, an example implementation of the use of the assembly is shown wherein tip 26 is released from stem 24 to provide an orifice 60 in fluid communication with the conduit through stem to container portion of insert 16. In accordance with example implementations, material within container portion 16 can be expelled and the plant supplement material provided to plant 14. The sheath can be removed from the assembly, and then the insert can then be removed from the housing, leaving the sheath and housing as well as the biasing member and biasing mechanism to be able to be used once again and recycled.

In accordance with the many embodiments disclosed, the present disclosure provides a description of a solution to the prior art problems wherein a multiplying pressurized delivery device that has replaceable and interchangeable parts can be selectively configured to deliver a preselected material to a designated location using a pressure multiplying effect based on the ratio of the areas to which the force is applied.

In preparation, the fluid plant supplement material can be sealed or closed into the insert in a non-pressurized state until the force from member 20 is applied at a later stage, for example, just prior to use. Material can be maintained in the insert and pressure of same can be maintained by a closure such as a built-in check valve, a crimping tool such as a clip or a heat sealed crimp in the stem that maintains pressure after filling. When use is needed, the stem can be opened to release fluid, (for example, cut) and the check valve released allowing the biasing mechanism move the member against the insert expelling the material at a desired rate. Accordingly, the biasing mechanism may be engaged and the member is released upon providing an exit for plant material.

The biasing mechanism can include a spring with a spring rate used to control the expelling of the material at a desired rate. Depending upon the material to be delivered and the rate of such delivery, internal components such as the material chamber or the spring may be altered and modified to the needs of the user. In some applications the spring can remain in an unbiased position until use is needed, thus reducing fatigue upon the spring and a resulting loss in force of the spring material. In some examples the operation of the delivery device is completed when the tip of the stem is inserted into the bore of the tree and the contents of the insert are exhausted.

The spring rate used to exert force against the against member 20 can be variously configured and interchangeable so as to allow the insert to expel the material at a desired rate. Depending upon the material to be delivered and the rate of such delivery, internal components such as the material container or the spring may be altered and modified to the needs of the user. In some applications the spring can remain in an unbiased position until use is needed, thus reducing fatigue upon the spring and a resulting loss in force of the spring material.

Referring again to FIGS. 15 and 16, it can be seen that the plant supplement delivery assembly 12 functions as an injector for injecting plant supplement into a plant. In the injector 12, the illustrated insert 16 functions as a one-time-use cartridge for holding fluid used to administer the injection to the plant. In certain embodiments, the entire injector 12 may be configured as a one-time-use, disposable product. Throughout this disclosure, the disclosed insert 16 may also be described as a fluid cartridge. Moreover, it can be seen that the illustrated housing 18 functions as a holder for the fluid cartridge 16. Thus throughout this disclosure, the disclosed housing 18 used for holding a fluid cartridge or insert 16 may be referred to as a cartridge holder. Finally, it can be seen that the disclosed sheath 22 and spring 56 function in combination as an actuator 150 for selectively actuating the injector 12 to administer an injection to a plant. This disclosure now turns to a detailed discussion of the embodiment disclosed in FIGS. 15 and 16 which uses the terms 'fluid cartridge,' 'cartridge holder,' and 'actuator' to describe the various components and subassemblies of the injector assembly.

The cartridge holder 18 has a proximal end portion 18*a* and a distal end portion 18*b* spaced apart along a longitudinal axis LA. The cartridge holder 18 defines a cartridge chamber 118 in which a portion of the fluid cartridge 16 is received. In the illustrated embodiment, the proximal end portion 18*a* of the cartridge holder 18 is open so that the fluid cartridge 16 is passable into the cartridge chamber 118 through the proximal end portion. The distal end portion 18*b* of the cartridge holder 18 includes an end wall extending transverse to the longitudinal axis LA, which provides a seat on which the fluid cartridge 16 may be supported within the cartridge chamber 118. The distal end wall of the cartridge holder comprises a slot 121, and the distal end portion 18*b* further comprises a pair of stop protrusions 120, which enables the injector to threadably advance into a plant by manually rotating the cartridge holder 18 as will be described more fully below. In the illustrated embodiment, the cartridge holder 18 further comprises two sets of exterior ratchet teeth 32 extending longitudinally along a generally cylindrical side wall of the cartridge holder. The sets of ratchet teeth 32 are configured to retain the sheath 22 (also referred to as an 'actuator member') at selected positions on the cartridge holder 18, as described more fully below. Each illustrated set of ratchet teeth 32 comprises one or more proximal ratchet teeth 32*a*, which function as non-actuating ratchet teeth for retaining the actuator member 22 in respective non-actuating positions, and one or more distal ratchet teeth 32*c*, which function as actuating ratchet teeth for retaining the actuator member in respective actuating positions. A set of ratchet teeth 32*a* may further comprise one or more (e.g., a plurality of) intermediate ratchet teeth 32*b* spaced apart along the longitudinal axis between the non-actuating position ratchet tooth or teeth 32*a* and the actuating position ratchet tooth or teeth 32*c*.

The fluid cartridge 16 comprises a compressible bulb 126, which defines the collapsible side wall 44 discussed above, and a nozzle 24 (referred to above as a 'stem') extending distally from the compressible bulb. In the illustrated embodiment, the nozzle and fluid cartridge 16 are integrated together to form a substantially monolithic structure (e.g., the fluid cartridge 16 may comprise a single piece of monolithic material formed in a blow molding process). The compressible bulb 126 comprises a proximal end portion 126*a* and a distal end portion 126*b* spaced apart along the longitudinal axis LA. The nozzle 24 extends distally from the distal end portion 126*b* of the bulb and defines a lumen or conduit in fluid communication with the interior of the bulb. Suitably, the distal end portion of the lumen of the nozzle 24 is sealed by a closure 26 (e.g., a heat sealed tip or a crimped tip) that may be opened immediately prior to use of the injector 12. The closure 26 enables the fluid cartridge 16 to be pre-filled with a dose a plant supplement fluid (e.g., an agrochemical solution). The fluid may fill a portion or all of the interior of the compressible bulb 26. In certain embodiments, the fluid is hermetically sealed within the fluid cartridge 16.

In the illustrated embodiment, the nozzle 24 further comprises an external thread 28. As explained above, the thread 28 enables the nozzle 24 to threadably advance into the plant to anchor or fasten the injector 12 in the plant during the administration of an injection.

The illustrated nozzle 24 further comprises an external locking flange 30 spaced apart along the longitudinal axis between the distal end portion 126*b* of the compressible bulb 126 and the distal tip of the nozzle. During assembly of the injector 12, the locking flange is configured to pass distally through the slot 121 when the locking flange is in a first rotational orientation with respect to the cartridge holder 18 (first rotational orientation not shown). After the flange 30 passes distally through the slot 121, the fluid cartridge 16 may be rotated in a first rotational direction RD1 about the longitudinal axis LA with respect to the cartridge holder to a second rotational orientation (shown in FIG. 15) at which the locking flange 30 engages the stop protrusions 120. In this configuration, the distal end portion of the cartridge holder 18*b* is captured between the proximal end portion of the locking flange 30 and the distal end portion 126*b* of the compressible bulb 126. Additionally, in this configuration, when the cartridge holder 18 is rotated in a second rotational direction RD2 opposite the first rotation direction RD1, the cartridge holder rotates the nozzle 24, enabling the injector to threadably advance into the plant for administering an injection.

In general, the compressible bulb 126 is configured to be compressed within the cartridge chamber 118 so that the fluid in the cartridge 18 may be expelled from the nozzle 24 into the plant after the nozzle has been opened. In the illustrated embodiment, the compressible bulb 126 is configured to be compressed longitudinally such that the length of the compressible bulb along the axis LA gradually decreases as the bulb is compressed. More particularly, the distal end portion 126*b* is supported against the distal end portion 18*b* of the cartridge holder 18, which enables the compressible bulb 126 to be compressed such that the proximal end portion 126*a* of the compressible bulb moves toward the distal end portion 126*b*.

As explained above, the compressible bulb 126 comprises a collapsible side wall 44. The collapsible side wall 44 extends longitudinally from the proximal end portion 126*a* to the distal end portion 126b. The collapsible side wall 44 has an expanded configuration shown in the drawings and also a collapsed configuration that is not shown. When the collapsible side wall 44 is in the expanded configuration, the compressible bulb 126 has a first length L1, and when the collapsible side wall is in the collapsed configuration, the compressible bulb has a second length L2 that is less than the first length. As explained below, the collapsible side wall 44 is configured to collapse in a controlled fashion from the expanded configuration to the collapsed configuration as the compressible bulb is compressed within the cartridge chamber 118.

In the illustrated embodiment, the collapsible side wall 44 comprises a cylindrical bellows. Here, the term 'cylindrical' is used to described the type of bellows that is used. It implies that the side wall which forms the cylindrical bellows defines a perimeter that extends circumferentially about a longitudinal axis LA. The word cylindrical here does not require a particular cross-sectional shape. In the illustrated embodiment, the cylindrical bellows has a substantially circular cross-sectional shape, but other cylindrical bellows may have other cross-sectional shapes, such as rectangular, oval, obround, etc. The side wall 44 comprises a plurality of folds 44a, 44b extending circumferentially about the longitudinal axis LA. In the illustrated embodiment, the side wall comprises a plurality of inner folds 44a and a plurality of outer folds 44b that alternate along the longitudinal axis to form the pleated configuration of a cylindrical bellows. From each fold 44a, 44b, a proximal segment 44ai, 44bi of the side wall and a distal segment 44aii, 44bii of the side extend radially with respect to the longitudinal axis LA. Additionally, at least one of the proximal and distal side wall segments 44ai, 44bi, 44aii, 44bii extending from a respective fold 44a, 44b extends longitudinally along the axis LA so that the proximal and distal segments at each fold extend longitudinally away from another as they extend radially from the fold. In the illustrated embodiment, each proximal segment 44ai extends proximally and radially outward from the respective inner fold 44a, each distal segment 44aii extends distally and radially outward from the respective inner fold, each proximal segment 44bi extends proximally and radially inward from the respective outer fold 44b, and each distal segment 44bii extends distally and radially inward from the respective inner fold. At each fold 44a, 44b, the side wall 44 defines an included angle α between the respective proximal and distal segments 44ai, 44bi, 44aii, 44bii. The collapsible side wall 44 is configured to bend along each of the one or more folds 44a, 44b such that the respective included angle α is greater in the expanded configuration of the collapsible side wall than in the collapsed configuration of the collapsible side wall. This ensures that the side wall 44 collapses in a controlled fashion and provides a relatively reliable mode for administering the injection.

It can be seen that the fluid cartridge 16 has a maximum outer diameter at the outer fold 44b. In one or more embodiments, the maximum outer diameter is in an inclusive range of from about 0.5 cm to about 5 cm. In certain embodiments, the extended length L1 of the bulb 126 is in an inclusive range of from about 0.5 cm to about 30 cm. The collapsed length L2 of the bulb 126 can be in an inclusive range of from about 10% to about 75% of the expanded length L1. In an exemplary embodiment, the nozzle 24 has a length along the axis LA in an inclusive range of from about 0.5 cm to about 15 cm. In certain embodiments, the fluid cartridge 16 contains a sealed volume of plant supplement fluid in an inclusive range of from about 10 mL to about 250 mL. It will be appreciated that fluid cartridges of other sizes and shapes may also be used without departing from the scope of the disclosure.

As explained above, the injector assembly comprises an actuator 150 configured to be selectively actuated to compress the bulb 126. In general, the actuator 150 is configured to impart a distal force on the proximal end portion 126a of the bulb 126 to gradually compress the compressible bulb. The actuator 150 comprises an actuator member 22 that is slidable distally along the cartridge holder 18 from a non-actuating position shown in the drawings to an actuating position (not shown). In the illustrated embodiment, the actuator member 22 has a cup-shaped or sheath-like configuration that includes a generally cylindrical side wall sized and arranged for slidably receiving the side wall of the cartridge holder therein. The illustrated actuator member 22 further comprises an enclosed proximal or butt end wall and an open distal end. The open distal end allows the proximal end portion 18a of the cartridge holder to pass into the actuator member 22. The actuator member 22 is configured to fasten to the cartridge holder 18 at each of the non-actuating position and the actuating position so as to retain the actuator member on the cartridge holder in the respective position.

In one or more embodiments, the actuator member 22 couples to the cartridge holder 18 via a bayonet or twist lock coupling. For example, it is contemplated that the actuator member 22 may comprise one or more bayonet slots (e.g., internal bayonet slots) that receive one or more bayonet protrusions (e.g., external bayonet protrusions) on the actuator member. Other arrangements of slots and protrusions may also be used for a bayonet coupling without departing from the scope of the disclosure. In an exemplary embodiment, the cartridge holder 18 is rotated in the first rotational direction RD1 about the longitudinal axis LA with respect to the actuator member 22 to engage the bayonet coupling. As such, after the bayonet coupling is engaged, rotation of the actuator member 22 in the second rotational direction RD2 rotates the cartridge holder 18 in the second rotational direction and thereby also rotates the nozzle 24, as explained above, to enable the injector to threadably advance into the plant for administering an injection.

The actuator member comprises a pair of resiliently deflectable pawl arms 152 having distal (pawl) end portions 40 that are resiliently bendable radially outward with respect to the side wall of the actuator member. The pawl arms 152 are configured so that the distal end portions snap over and sequentially engage the ratchet teeth 32 as the actuator member moves from the non-actuating position to the actuating position. When the pawl arms 152 are operatively engaged with the non-actuating ratchet teeth 32a, the pawl arms retain the actuator member 22 on the cartridge holder 18 in the non-actuating position. And likewise, when the pawl arms 152 are operatively engaged with the actuating ratchet teeth 32c, the pawl arms retain the actuator member 22 on the cartridge holder 18 in the actuating position. The pawl arms 152 pass over the intermediate ratchet teeth 32b in ratcheting fashion as the actuator member 152 moves distally from the non-actuating position to the actuating position and thereby limit back-movement of the actuator member 22 as it is pressed forward to administer an injection.

As explained above, the actuator 150 further comprises a resiliently compressible member 56 coupled to the actuator member 22. In the illustrated embodiment the resiliently compressible member 56 comprises a coil spring extending between the proximal or butt end of the actuator member 22 and the proximal end portion 126a of the bulb 126. The spring 56 is configured to be uncompressed when the actuator member 22 is in the non-actuating position and to be resiliently compressed between the actuator member and the proximal end portion 126a of the bulb 126 when the actuator member is moved to the actuating position. In the illustrated embodiment, the spring 56 is configured to directly engage the proximal end portion 126a of the compressible bulb 126. In other words, there is no intermediate plunger between the spring 56 and the bulb 126.

During one method of using of the injector 12, the closure 26 is separated from the remainder of the nozzle 24 and the nozzle is threadably advanced into a pilot hole pre-formed in the plant. Initially, the actuator member 22 is in the non-actuating position. When the actuator member 22 is in the non-actuating position, the compressible bulb 126 is uncompressed and has the length L1. To administer the injection, the actuator member 22 is pressed distally to the actuating position. When the actuator member 22 is moved to the actuating position, initially, the spring 56 compresses. The compressed spring 56 begins to resiliently rebound and compress the bulb 126 by collapsing the side wall 44 longitudinally as explained above. The spring 56 is configured to gradually expand upon being compressed to gradually compress the compressible bulb 126 within the cartridge chamber 118 and gradually expel the fluid from the injector 12 into the plant. In some cases, it may take on the order of from a few seconds to several hours (or perhaps longer depending on the type of plant and fluid involved) to expel all of the fluid from the bulb 126. When the spring 44 fully expands, the actuator 150 compresses the compressible bulb to the collapsed length L2 and thereby expels substantially all of the fluid from the cartridge 16.

Although the illustrated injector is described as utilizing a resilient member to collapse the bulb and thereby expel fluid from a compressible fluid cartridge, it will be understood that other actuators may also be used for this purpose without departing from the scope of this disclosure. For example, it is contemplated that an actuator may alternatively comprise a pressure-driven piston, such as a piston driven by manual pressure or fluid (e.g., pneumatic) pressure to compress the bulb and administer the injection. Still other types of actuators are also possible.

Other Statements of Subject Matter which May be Claimed

1. An injector for administering an injection to a plant, the injector comprising:
   a cartridge holder having a proximal end portion and a distal end portion spaced apart along a longitudinal axis, the cartridge holder defining a cartridge chamber;
   a fluid cartridge comprising a compressible bulb having a proximal end portion and a distal end portion spaced apart along the longitudinal axis, the compressible bulb holding fluid therein, the compressible bulb being received in the cartridge chamber and configured to be compressed within the cartridge chamber such that the fluid is expelled from the injector into the plant.

2. The injector as set forth in statement 1, wherein the compressible bulb is configured to be compressed longitudinally.

3. The injector as set forth in either of statements 1 and 2, wherein the compressible bulb is configured to be compressed such that the proximal end portion of the compressible bulb moves toward the distal end portion.

4. The injector as set forth in any of statements 1-3, wherein the compressible bulb comprises a collapsible side wall extending longitudinally from the proximal end portion to the distal end portion.

5. The injector as set forth in statement 4, wherein the collapsible side wall has an expanded configuration and a collapsed configuration and is configured to collapse from the expanded configuration to the collapsed configuration as the compressible bulb is compressed within the cartridge chamber.

6. The injector as set forth in statement 5, wherein the collapsible side wall is configured to collapse in a controlled fashion from the expanded configuration to the collapsed configuration as the compressible bulb is compressed within the cartridge chamber.

7. The injector as set forth in either of statements 5 and 6, wherein the compressible bulb has a first length along the longitudinal axis when the collapsible side wall is in the expanded configuration and a second length along the longitudinal axis when the collapsible side wall is in the collapsed configuration, the second length being less than the first length.

8. The injector as set forth in any of statements 5-7, wherein the collapsible side wall comprises one or more folds extending circumferentially about the longitudinal axis, a proximal side wall segment extending radially with respect to the longitudinal axis from each of the one or more folds, and a distal side wall segment extending radially with respect to the longitudinal axis from each of the one or more folds such that each proximal side wall segment and the respective distal side wall segment define an included angle therebetween.

9. The injector as set forth in statement 8, wherein the collapsible side wall is configured to bend along each of the one or more folds such that the respective included angle is greater in the expanded configuration of the collapsible side wall than in the collapsed configuration of the collapsible side wall.

10. The injector as set forth in either if statements 8 and 9, wherein the one or more folds comprises at least one inner fold and at least one outer fold, the respective proximal and distal side wall segments extending radially outward from the at least one inner fold and the respective proximal and distal side wall segments extending radially inward from the at least one outer fold.

11. The injector as set forth in statement 10, wherein the collapsible side wall comprises a plurality of inner folds and a plurality of outer folds that alternate along the longitudinal axis.

12. The injector as set forth in any of statements 4-11, wherein the collapsible side wall comprises a cylindrical bellows.

13. The injector as set forth in statement 12, wherein the cylindrical bellows is substantially circular in cross-section.

14. The injector as set forth in any of statements 1-13, wherein the distal end portion of the compressible bulb is supported against the distal end portion of the cartridge holder.

15. The injector as set forth in any of statements 1-14, wherein the injector comprises a nozzle extending distally from the distal end portion of the cartridge holder.

16. The injector as set forth in statement 15, wherein the nozzle comprises an external thread configured to threadably advance into the plant to fasten the injector in the plant.

17. The injector as set forth in either of statements 15 and 16, wherein the nozzle comprises a removable tip closure.

18. The injector as set forth in any of statements 15-17, wherein the nozzle is part of the fluid cartridge.

19. The injector as set forth in statement 18, wherein the nozzle and the bulb are integrally formed from a single monolithic structure.

20. The injector as set forth in any of statements 18 and 19, wherein the fluid cartridge further comprises a locking flange on the nozzle.

21. The injector as set forth in statement 20, wherein the distal end portion of the cartridge holder comprises a slot, the locking flange being passable distally through the slot when the locking flange is in a first rotational orientation with respect to the cartridge holder.

22. The injector as set forth in statement 21, wherein the cartridge holder comprises a stop protrusion formed on the distal end portion of the cartridge holder, the locking flange being configured to engage the stop protrusion after passing distally through the slot and rotating in a first rotational direction about the longitudinal axis with respect to the cartridge holder to a second rotational orientation angularly offset from the first rotational orientation.

23. The injector as set forth in statement 22, wherein the nozzle is configured to threadably advance into the plant by rotating the injector in a second rotational direction about the longitudinal axis opposite to the first rotational direction.

24. The injector as set forth in either of statements 22 or 23, wherein the locking flange comprises a proximal end portion configured to engage the distal end portion of the cartridge holder to resist movement of the fluid cartridge relative to the cartridge holder in a proximal direction.

25. The injector as set forth in statement 24, wherein the distal end portion of the cartridge holder is captured between the proximal end portion of the locking flange and the distal end portion of the compressible bulb.

26. The injector as set forth in any of statements 1-25, further comprising an actuator configured to be selectively actuated to compress the compressible bulb.

27. The injector as set forth in statement 26, wherein the actuator is configured to impart a distal force on the bulb to compress the compressible bulb.

28. The injector as set forth in either of statements 26 or 27, wherein the actuator is configured to gradually compress the compressible bulb.

29. The injector as set forth in any of statements 26-28, wherein the actuator comprises an actuator member that is movable with respect to the cartridge holder from a non-actuating to an actuating position.

30. The injector as set forth in statement 29, wherein in the non-actuating position the compressible bulb is uncompressed and in the actuating position the actuator is configured to compress the compressible bulb.

31. The injector as set forth in statement 30, wherein the actuator member is configured to fasten to the cartridge holder at each of the non-actuating position and the actuating position so as to retain the actuator member on the cartridge holder.

32. The injector as set forth in any of statements 29-31, wherein the actuating position is distal of the non-actuating position along the longitudinal axis.

33. The injector as set forth in any of statements 29-32, wherein the actuator member comprises at least one pawl arm and the cartridge holder comprises a set of ratchet teeth, wherein the pawl arm is configured to sequentially engage the ratchet teeth as the actuator member moves from the non-actuating position to the actuating position.

34. The injector as set forth in statement 33, wherein the set of ratchet teeth includes a non-actuating position ratchet tooth configured to engage the pawl arm and thereby retain the actuator member on the cartridge holder in the non-actuating position.

35. The injector as set forth in statement 34, wherein the set of ratchet teeth includes an actuating position ratchet tooth configured to engage the pawl arm and thereby retain the actuator member on the cartridge holder in the actuating position.

36. The injector as set forth in statement 35, wherein the set of ratchet teeth includes a plurality of intermediate ratchet teeth spaced apart along the longitudinal axis between the non-actuating position ratchet tooth and the actuating position ratchet tooth.

37. The injector as set forth in statement 33, wherein the set of ratchet teeth includes an actuating position ratchet tooth configured to engage the pawl arm and thereby retain the actuator member on the cartridge holder in the actuating position.

38. The injector as set forth in any of statements 29-37, wherein the actuator further comprises a resiliently compressible member coupled to the actuator member.

39. The injector as set forth in statement 38, wherein the resiliently compressible member is configured to be uncompressed when the actuator member is in the non-actuating position and be resiliently compressed between the actuator member and the proximal end portion of the bulb when the actuator member is in the actuating position.

40. The injector as set forth in any of statements 38-39, wherein the resiliently compressible member comprises a coil spring.

41. The injector as set forth in any of statements 38-40, wherein the resiliently compressible member is configured to directly engage the proximal end portion of the compressible bulb.

42. The injector as set forth in any of statements 38-40, wherein the resiliently compressible member is configured to gradually expand upon being compressed to gradually compress the compressible bulb within the cartridge chamber such that the fluid is gradually expelled from the injector into the plant.

43. The injector as set forth in any of statements 1-42, wherein the fluid bulb is hermetically sealed.

44. A fluid cartridge for use in administering an injection to a plant, the fluid cartridge comprising:
    a nozzle having a distal tip and a proximal end portion spaced apart from the distal tip along a longitudinal axis, the nozzle comprising closure at the distal tip and a lumen extending from the closure through the proximal end portion of the nozzle, the closure being configured to be selectively opened to administer the injection through the lumen of the nozzle; and
    a compressible bulb having a distal end portion and a proximal end portion spaced apart along the longitudinal axis, the distal end portion of the compressible bulb being connected to the proximal end portion of the nozzle, the compressible bulb holding fluid therein and being in fluid communication with the lumen of the nozzle, the compressible bulb being configured to be compressed such that the fluid is expelled from the injector into the plant.

45. The fluid cartridge as set forth in statement 44, wherein the compressible bulb is configured to be compressed longitudinally.

46. The fluid cartridge as set forth in either of statements 44 and 45, wherein the compressible bulb is configured to be compressed such that the proximal end portion of the compressible bulb moves toward the distal end portion.

47. The fluid cartridge as set forth in any of statements 44-46, wherein the compressible bulb comprises a collapsible side wall extending longitudinally from the proximal end portion to the distal end portion.

48. The fluid cartridge as set forth in statement 47, wherein the collapsible side wall has an expanded configuration and a collapsed configuration and is configured to collapse from the expanded configuration to the collapsed configuration as the compressible bulb is compressed.

49. The fluid cartridge as set forth in statement 48, wherein the collapsible side wall is configured to collapse in a controlled fashion from the expanded configuration to the collapsed configuration as the compressible bulb is compressed.

50. The fluid cartridge as set forth in either of statements 48 and 49, wherein the compressible bulb has a first length along the longitudinal axis when the collapsible side wall is in the expanded configuration and a second length along the longitudinal axis when the collapsible side wall is in the collapsed configuration, the second length being less than the first length.

51. The fluid cartridge as set forth in any of statements 48-50, wherein the collapsible side wall comprises one or more folds extending circumferentially about the longitudinal axis, a proximal side wall segment extending radially with respect to the longitudinal axis from each of the one or more folds, and a distal segment extending radially with respect to the longitudinal axis from each of the one or more folds such that each proximal side wall segment and the respective distal side wall segment define an included angle therebetween.

52. The fluid cartridge as set forth in statement 51, wherein the collapsible side wall is configured to bend along each of the one or more folds such that the respective included angle is greater in the expanded configuration of the collapsible side wall than in the collapsed configuration of the collapsible side wall.

53. The fluid cartridge as set forth in either if statements 51 and 52, wherein the one or more folds comprises at least one inner fold and at least one outer fold, the respective proximal and distal side wall segments extending radially outward from the at least one inner fold and the respective proximal and distal side wall segments extending radially inward from the at least one outer fold.

54. The fluid cartridge as set forth in statement 53, wherein the collapsible side wall comprises a plurality of inner folds and a plurality of outer folds that alternate along the longitudinal axis.

55. The fluid cartridge as set forth in any of statements 47-54, wherein the collapsible side wall comprises a cylindrical bellows.

56. The fluid cartridge as set forth in statement 55, wherein the cylindrical bellows is substantially circular in cross-section.

57. The fluid cartridge as set forth in any of statements 44-56, wherein the nozzle comprises an external thread configured to threadably advance into the plant to fasten the injector in the plant.

58. The fluid cartridge as set forth in any of statement 44-57, wherein the nozzle and the compressible bulb are integrally formed from a single monolithic piece of material.

59. The fluid cartridge as set forth in any of statements 44-58, wherein the fluid cartridge is blow molded.

60. The fluid cartridge as set forth in any of statements 44-59, wherein the fluid cartridge further comprises a locking flange on the nozzle.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for providing plant supplements using an insert comprising a plant supplement container comprising collapsible sidewalls extending between a discharge end and a butt end to define a container configured to house a plant supplement, the butt end configured to operably engage a biased member; and a stem extending from the discharge end, the stem defining a conduit in fluid communication with the container, the method comprising:
    inserting the stem of the insert into a nose end of a housing, the stem and the nose end of the housing engaging upon insertion to rotationally affix the stem and nose end of the housing;
    inserting the stem into a plant by rotating the housing to rotate the stem to engage the plant; and
    affixing a sheath to slidably engage the housing and operably engaging the biased member with the butt end of the plant supplement container to collapse the collapsible sidewalls of the container and provide the plant supplement from the container through the stem into the plant.

2. The method of claim 1 wherein the slidably engaging comprises compressing a spring between the sheath and the butt end of the container.

3. The method of claim 1 wherein the container and stem are aligned along the same linear axis.

4. The method of claim 3 wherein the container and stem are inserted into the housing along the same linear axis.

5. The method of claim 4 wherein the housing is rotated about the linear axis.

6. The method of claim 1 further comprising opposing flanges extending from the stem, the method comprising engaging the opposing flanges with opposing recesses within the nose end of the housing.

7. The method of claim 1 further comprising threading the stem into the plant using raised portions along the stem when rotating the stem.

8. The method of claim 1 further comprising engaging the housing and the sheath with coupling mechanisms.

9. The method of claim 8 wherein the coupling mechanisms are configured to retain the biasing member in a biased position between the sheath and the butt end of the insert.

10. The method of claim 9 further comprising engaging the coupling mechanism to engage the biasing member with the butt end of the container.

11. A plant supplement delivery assembly, the assembly comprising:
    a housing extending along a linear axis and having exterior sidewalls defining a chamber extending to a nose end, the nose end defining an opening configured to receive a sheath and a pair of opposing recesses;
    an insert assembly received along the linear axis within the chamber of the housing, wherein the insert assembly comprises:
        collapsible sidewalls extending between a discharge end and a butt end to define a container configured to house a plant supplement, the butt end configured to operably engage a releasably biased member;
        a stem extending from the discharge end, the stem defining a conduit in fluid communication with the container and extending through the nose sheath, the stem configured to engage and provide fluid from the container through the conduit to the plant; and a pair of opposing flanges extending from the stem and received by the opposing recesses to rotatably affix the housing to the insert;

a biased member within the housing and operably aligned to engage the container;

a sheath configured to slidably engage the housing; and complimentary interlocking members configured to affix the sheath to the housing, the affixing engaging the biased member between the butt end of the insert assembly and the sheath.

12. The assembly of claim 11 wherein the interlocking members comprise ratcheted raised portions configured to engage a coupling end, wherein each raised portion defines different affixed relationships between the sheath and the housing.

13. The assembly of claim 11 wherein the complimentary portions define at least one row of teeth and at least a single tooth engageable to affix the sheath in relation to the housing.

14. The assembly of claim 11 further comprising a plurality of raised portions extending along the stem.

15. The assembly of claim 14 wherein the raised portions define threading configured to assist inserting or removing the stem from an orifice.

16. The assembly of claim 11 further comprising a removable tip sealing the conduit of the stem.

17. The assembly of claim 16 wherein the tip is configured to be snapped away from the stem.

18. The assembly of claim 11 wherein collapsible sidewalls of the container are configured as bellows.

\* \* \* \* \*